(12) United States Patent
Ferguson et al.

(10) Patent No.: US 6,800,234 B2
(45) Date of Patent: Oct. 5, 2004

(54) METHOD FOR MAKING A MOLDED POLYMERIC ARTICLE

(75) Inventors: Dennis E. Ferguson, Mahtomedi, MN (US); James J. Kobe, Newport, MN (US); Bradley D. Zinke, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 199 days.

(21) Appl. No.: 10/005,831

(22) Filed: Nov. 9, 2001

(65) Prior Publication Data

US 2003/0090030 A1 May 15, 2003

(51) Int. Cl.[7] .............................. B29C 33/38; C25D 1/10
(52) U.S. Cl. ..................... 264/220; 264/225; 264/299; 205/70
(58) Field of Search ............................ 205/70; 264/299, 264/220, 225, 293

(56) References Cited

U.S. PATENT DOCUMENTS

| | | | |
|---|---|---|---|
| 3,028,283 A | 4/1962 | Lundgren et al. | |
| 3,266,113 A | 8/1966 | Flanagan, Jr. ................. | 24/204 |
| 3,585,101 A | 6/1971 | Stratton et al. .............. | 161/116 |
| 3,723,584 A | 3/1973 | Nussbaum .................... | 264/45 |
| 3,835,470 A | 9/1974 | Greiter ............................. | 2/79 |
| 4,152,387 A | 5/1979 | Cloeren ....................... | 264/171 |

(List continued on next page.)

FOREIGN PATENT DOCUMENTS

| | | | | |
|---|---|---|---|---|
| DE | 32 00 693 A1 | 7/1983 | ............ | B25G/1/10 |
| EP | 0 456 949 A1 | 11/1991 | | |
| EP | 0 844 056 A1 | 5/1998 | | |
| EP | 0 855 705 A1 | 12/1998 | | |
| GB | 740853 | 11/1955 | | |
| GB | 2 037 536 A | 7/1980 | ............ | H04M/1/11 |
| WO | WO 95/16371 | 6/1995 | | |
| WO | WO 97/27775 | 8/1997 | ........... | A44B/21/00 |
| WO | WO 00/20210 | 4/2000 | ........... | B32B/28/08 |

OTHER PUBLICATIONS

European Patent Office Patent Abstracts of Japan, publication No. 04208171, publication date Jul. 29, 1992, application date Aug. 10, 1990, application No. 02213250, applicant: Kunimori Kagaku:KK; title: Manufacture of Grip for Golf Club.

European Patent Office Abstracts of Japan, publication No. 11000202, publication date Jun. 1, 1999, application date Jun. 13, 1997, application No. 09156485, applicant: Bridgestone Sports Co. Ltd., title: Golf Shoes.

*Primary Examiner*—Allan R. Kuhns
(74) *Attorney, Agent, or Firm*—Karl G Hanson; James L. Young

(57) ABSTRACT

This disclosure relates to a method for making a polymeric article mold, a method for making a polymeric article with that mold, and improved surface topography features for a polymeric article. A prototype article is formed and then coated with a thin conductive layer. The coated prototype article is then electroformed until nickel plated to a sufficient depth to define a nickel plating tool. After the prototype article has been removed from the mold face of the nickel tool, the tool can be used as a mold for forming finished polymeric articles which replicate the original prototype article. The use of fine topography features such as a dense upstanding stem array on the surface of the prototype article facilitates accurate and complete electroforming by increased surface area presentation. The disclosure also presents improvements to microreplicated surface structures such as stem arrays. The improvements include the formation on a stem array having separate zones of stems of differing heights, and the formation of directional microreplicated features (e.g., stems) which are oriented and shaped to promote or restrict frictional interaction in one or more particular directions.

41 Claims, 8 Drawing Sheets

U.S. PATENT DOCUMENTS

| | | | | |
|---|---|---|---|---|
| 4,250,135 A | * | 2/1981 | Orsini | 264/227 |
| 4,285,901 A | * | 8/1981 | Yotsutsuji et al. | 264/225 |
| 4,290,174 A | | 9/1981 | Kallenberg | 24/204 |
| 4,478,769 A | | 10/1984 | Pricone et al. | 264/1.6 |
| 4,488,918 A | | 12/1984 | Jofs | 156/79 |
| 4,872,243 A | | 10/1989 | Fischer | 24/442 |
| 4,919,420 A | | 4/1990 | Sato | 273/81 B |
| 4,953,862 A | | 9/1990 | Uke et al. | 273/75 |
| 4,959,265 A | | 9/1990 | Wood et al. | 428/343 |
| 4,984,339 A | * | 1/1991 | Provost et al. | 24/452 |
| 5,073,237 A | | 12/1991 | Bacher et al. | 264/320 |
| 5,077,870 A | | 1/1992 | Melbye et al. | 24/452 |
| 5,201,101 A | | 4/1993 | Rouser et al. | 24/575 |
| 5,225,133 A | * | 7/1993 | Ihara et al. | 264/163 |
| 5,234,740 A | | 8/1993 | Reeves et al. | 428/167 |
| 5,302,440 A | | 4/1994 | Davis | 428/196 |
| 5,427,376 A | | 6/1995 | Cummings et al. | 273/187.5 |
| 5,453,173 A | * | 9/1995 | Oyama | 205/70 |
| 5,491,015 A | | 2/1996 | Reeves et al. | 428/167 |
| 5,508,084 A | | 4/1996 | Reeves et al. | 428/172 |
| 5,511,248 A | | 4/1996 | Widdemer | 2/161.3 |
| 5,676,092 A | | 10/1997 | Ortolivo | 119/650 |
| 5,741,394 A | | 4/1998 | Kennedy | 156/391 |
| 5,759,455 A | | 6/1998 | Kamitakahara et al. | 264/1.34 |
| 5,939,011 A | * | 8/1999 | White et al. | 264/401 |
| 5,958,469 A | | 9/1999 | Richards | 425/175 |
| 6,099,289 A | | 8/2000 | Jens et al. | 425/363 |
| 6,115,874 A | | 9/2000 | Camilleri et al. | 15/236.08 |
| 6,131,972 A | | 10/2000 | Whitehead et al. | 284/57 |
| 6,132,660 A | * | 10/2000 | Kampfer | 264/167 |
| 6,163,939 A | * | 12/2000 | Lacey et al. | 24/452 |
| 6,251,208 B1 | | 6/2001 | Serizawa et al. | 156/232 |
| 6,558,496 B1 | * | 5/2003 | Brooke et al. | 156/230 |
| 6,565,693 B1 | * | 5/2003 | Brooke | 156/230 |

* cited by examiner

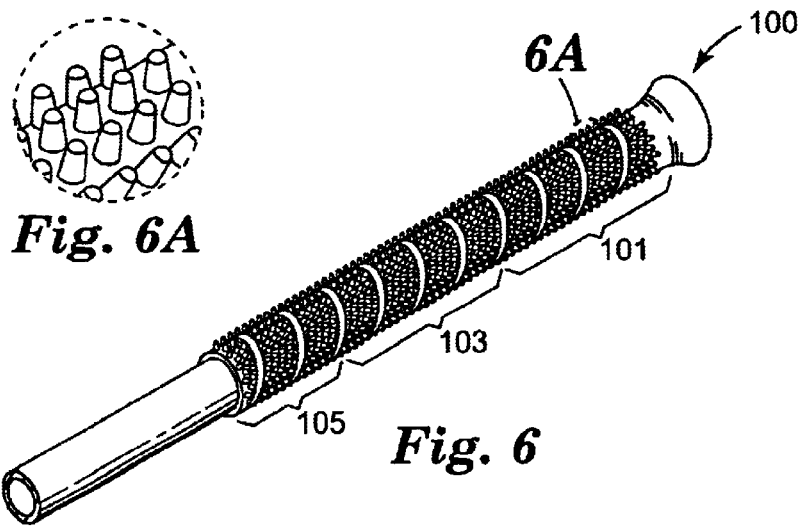
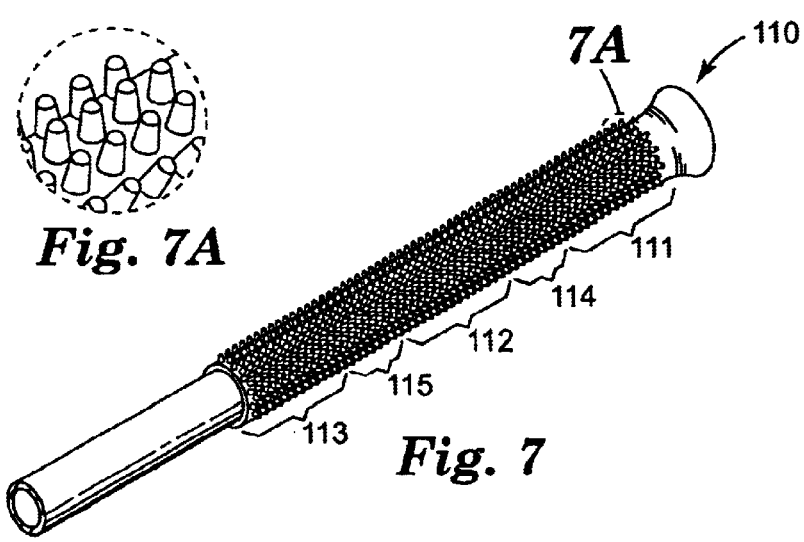

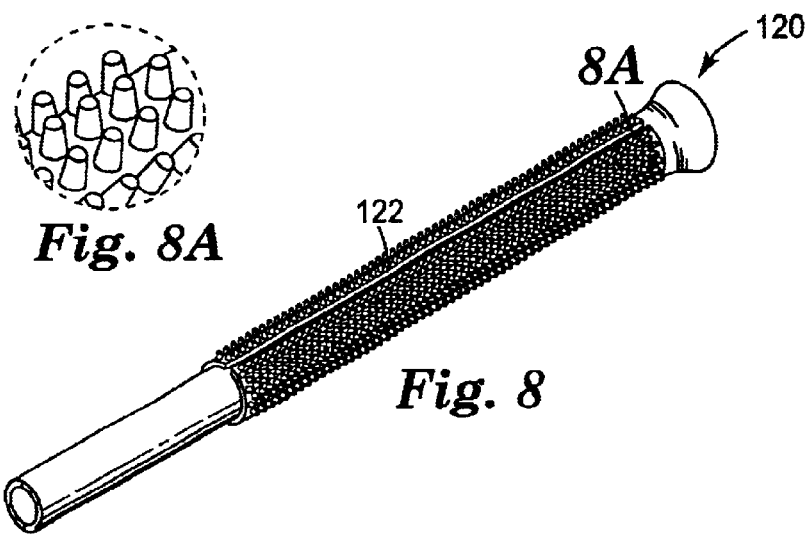
Fig. 8A
Fig. 8
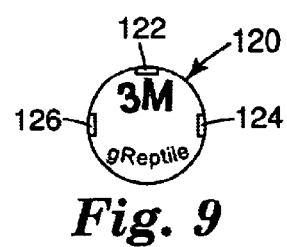
Fig. 9
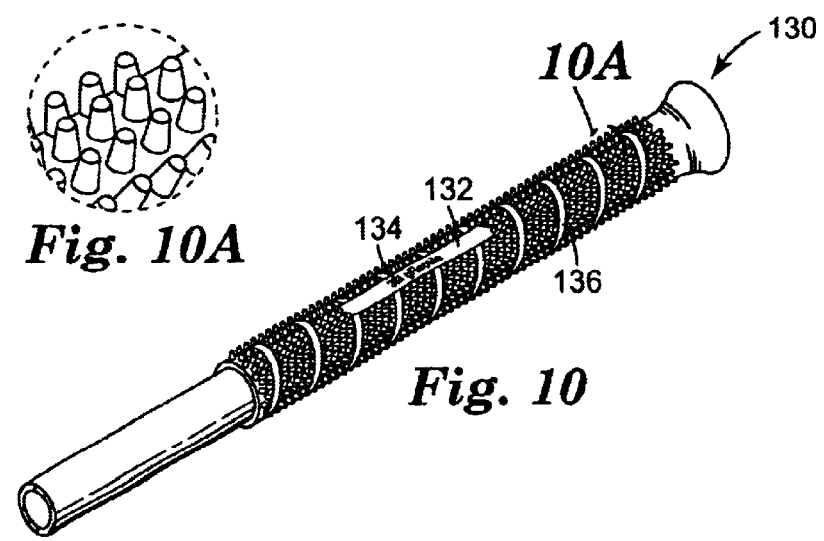
Fig. 10A
Fig. 10

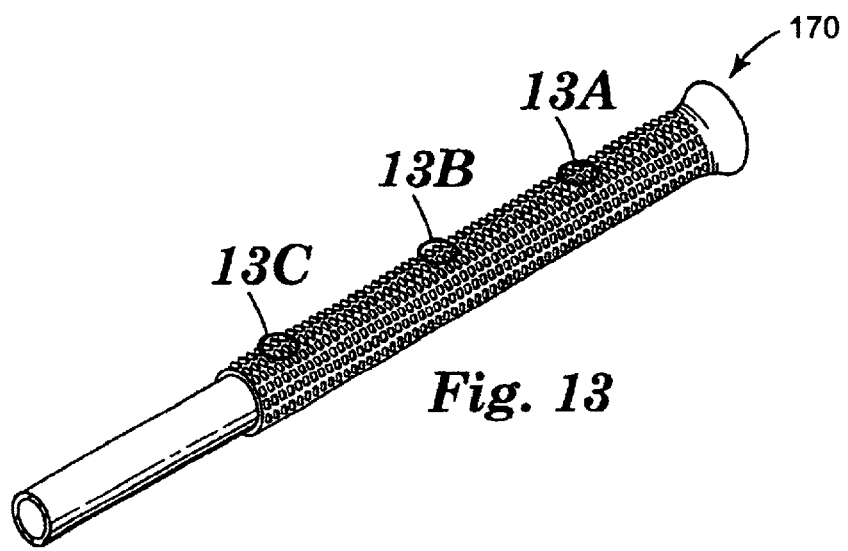
Fig. 13
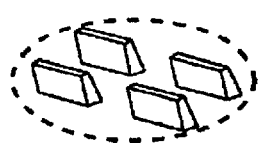  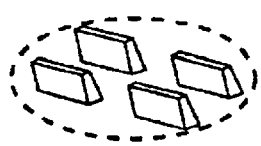
Fig. 13A　　Fig. 13B　　Fig. 13C

METHOD FOR MAKING A MOLDED POLYMERIC ARTICLE

BACKGROUND OF THE INVENTION

The present invention is directed to improvements in forming molded polymeric articles, and includes a method for making microreplicated articles and a method of making molds for such articles for use in injection or insert molding processes. The present invention also is directed to improved surface topography features for polymeric articles.

Minnesota Mining and Manufacturing Company has recently introduced a friction control material for use on glove and handle wrap applications which facilitates high slip resistance in the direction of shear, in wet or dry conditions. This material, known as GREPTILE™ gripping material is commercially available in sheet and strip form. The material has a surface defined by an array of elastomeric uniformly shaped upstanding stems which are highly flexible. When a normal force is applied to the stem array surface, the stems deform and bend over, thereby increasing the effective surface area of the gripping material relative to applied shear forces. The material thus presents an aggressive friction control surface. When used with a like material in an opposed relation, the stems of the two materials interengage, thereby presenting even more surface area to each other for relative frictional interface. The stems do not interlock, however, so virtually zero peel force is required to separate the two opposed stem arrays. This material is more fully disclosed in pending U.S. patent application Ser. No. 09/637,567, now U.S. Pat. No. 6,610,382 (which is incorporated by reference herein), commonly owned by the applicant herein, 3M Innovative Properties Company.

Known stem-web containing polymeric articles are often formed by molding techniques. When the desired article includes intricate or numerous topography features, the mold must necessarily include such intricate and numerous topography features, in mirror image. Creating such intricate features on molds has heretofore been a relatively expensive proposition. For instance, if the mold is to include microreplicated features such as generally cylindrical headless stem elements, the mold must include a hole or channel for each stem to form therein, and those holes must thus be individually drilled in the mold material. Attempts to use mold segment replication have been tried, but such an approach is limited by molding and pattern materials that will suffice for such replication purposes for a microreplicated surface, and still result in relatively expensive mold production techniques.

BRIEF SUMMARY OF THE INVENTION

In one embodiment, the present invention is directed to a method of making a molded polymeric article. The method includes electroforming a plating onto a first surface of a prototype article, wherein the first surface is defined at least in part by a desired arrangement of fine topography features and is electrically conductive, so that the plating defines an article mold having, on a first portion thereof corresponding to the first surface of the prototype article, a reverse image arrangement of the fine topography features thereon. The article mold is separated from the prototype article, and polymeric material is then introduced into the article mold, with the polymeric material flowing into and over the reverse image arrangement of fine topography features. After curing, the polymeric material and the article mold are separated to define a molded polymeric article having, on a finished surface corresponding to the first portion of the article mold, the desired arrangement of fine topography features therein.

In one inventive embodiment, the inventive method is directed to a process for making a mold for use in forming a polymeric molded article. The inventive process includes the steps of forming a prototype article having a first surface thereon, with the first surface defined at least in part by an array of upstanding stems; coating portions of the prototype article, including at least the first surface thereon, with a thin layer of conducted material; electroforming a plating onto the coated portions of the prototype article to define an article mold having, on a first portion thereof, corresponding to the first surface of the prototype article, an array of upstanding stem cavities therein; and separating the prototype article from the article mold.

In another embodiment of the invention disclosed herein, a method of making a mold for use in forming a polymeric molded article comprises electroforming a plating onto a first surface of a prototype article, wherein the first surface is defined at least in part by an arrangement of fine topography features and is electrically conductive, so that the plating defines an article mold having, on a first portion thereof corresponding to the first surface of the prototype article, a reverse image arrangement of the fine topography features.

In the context of this disclosure, "microreplicated" or "microreplication" means the production of a microstructured surface through a process where the structured surface features retain an individual feature fidelity during manufacture, from product-to-product, that varies no more than about 50 micrometers. The use of polymeric materials for forming the microstructured surface allows individual feature fidelities to be maintained in the manufacturing process at relatively high tolerances.

BRIEF DESCRIPTION OF THE DRAWINGS

The present invention will be further explained with reference to the drawing figures referenced below, wherein a like structure is referred to by like numerals throughout the several views.

FIG. 6 is a perspective view of a golf club grip made according to the present invention.

FIG. 7 is a perspective view of a second alternative golf club grip made according to the present invention.

FIG. 8 is a perspective view of a third alternative golf club grip made according to the present invention.

FIG. 9 is an end view of the golf club grip of FIG. 8.

FIG. 10 is a perspective view of a fourth alternative golf club grip made according to the present invention.

FIGS. 6A, 7A, 8A and 10A are enlarged perspective views of a portion of the surface of the golf club grips of FIGS. 6, 7, 8 and 10, respectively.

FIG. 13 is a perspective view of a sixth alternative golf club grip made according to the present invention.

FIGS. 13A, 13B and 13C are enlarged perspective views of portions of the surface of the golf club grip of FIG. 13.

Figure 1:
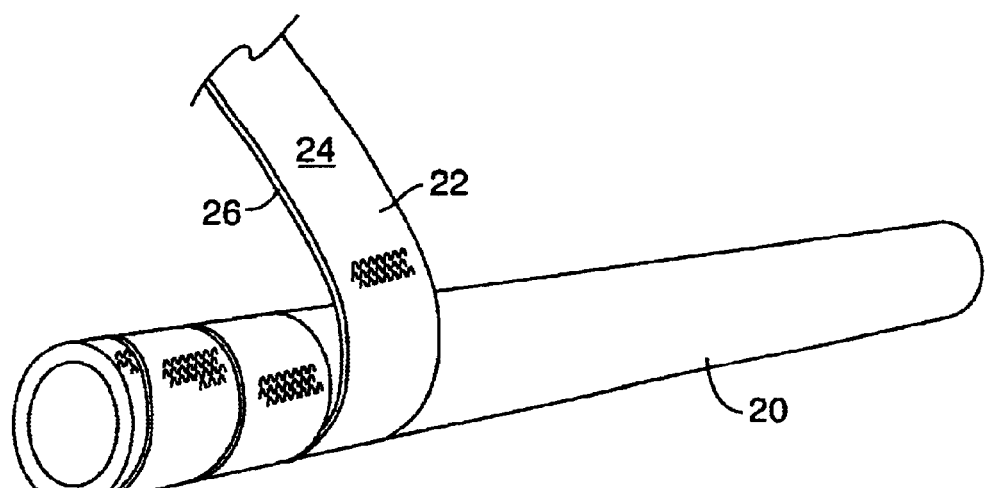
FIG. 1 is a perspective view of a prototype article being formed for use in the process of making a replicate electroformed mold therefrom.

While the above-identified drawing figures set forth several embodiments, other embodiments of the present invention are also contemplated, as noted in the discussion. This disclosure presents illustrative embodiments of the present invention by way of representation and not limitation. Numerous other modifications and embodiments can be devised by those skilled in the art which fall within the scope and spirit of the principals of this invention. The drawing figures are not drawn to scale.

DETAILED DESCRIPTION

The present invention relates to the development of a simple and inexpensive technique for creating a mold for polymeric articles, and the articles formed therefrom (and particularly for articles including a microreplicated surface thereon). One particular application for using the inventive techniques is to make molded polymeric grips, such as grips for bicycle or motorcycle handle bars, golf clubs, baseball or softball bats, ski poles, jet skis handles, hockey sticks, and other sporting grips and tool grips. Such grips can be injection molded (or also by other suitable processes, such as casting, insert molding, vacuum casting, etc.), and, with the application of the present invention, can have detailed microreplicated surface topography features precisely molded into the surface of the grip. The use of such a grip in combination with a similar microreplicated surface on a glove provides a high shear resistance gripping system therebetween. A grip typically is elongated longitudinally along a central axis, and the gripping surface is the outer surface of the grip, circumferentially disposed about the grip's axis. The grip may be generally cylindrical, or may have portions which are asymmetrical (such as pistol grip portion). Other applications for using the inventive techniques include forming polymeric articles for use in light management, microfluidics, friction control, and fluid control applications, to name but a few.

In the case of the grip, the inventive method utilizes grip material produced in web form using silicone or metal tooling technology (such as taught in U.S. application Ser. No. 09/637,567) to create a prototype article of the desired grip. The prototype article is assembled to essentially the desired shape and dimensions for the ultimately desired finished product. When the desired finished product is an injection molded grip, the prototype article is formed by building up a grip core, and then covering it with a web of grip material, aligned thereon to present a gripping surface and other visual or functional design features. Once such a prototype article is fully assembled, it can be used to make a reverse-image mold. Attempts to use such a prototype article with prior mold forming techniques were unsuccessful. In such prior techniques, the prototype article is formed and then a reverse copy is made by placing the prototype article in a container and filling the container with silicone rubber. After the silicone rubber had cured, the prototype article could then be removed. Because of the flexibility of the silicone rubber, details on the surface of the prototype article were preserved in a mold cavity, in mirror image form, on the silicone rubber mold. Epoxy was then poured into the silicone rubber mold to fill the mold cavity and replicate the original prototype article. Once the epoxy cured, it was then separated from the silicone rubber mold. The epoxy replicate article was then coated with a conductive material and immersed in an electroforming bath to be nickel plated. After plating to a sufficient thickness, a nickel molding tool was formed. The epoxy material was then removed by a suitable extraction process to form the injection mold cavity which was intended to be a mirror, image cavity, corresponding to the outer desired configuration for the finished grip. This technique, while useable for many articles, proved less desireable with respect to making production quality and quantity grips having the fine surface topography features of the desired gripping surface (such as found on the surface of the GREPTILE™ gripping material) because, for one, the surface features did not adequately transfer using epoxy. The epoxy was too brittle to completely survive being stripped from the silicone rubber mold, and surface topography features were thus damaged or lost. The epoxy stems were difficult to remove from the silicone rubber and would require destroying the silicone rubber.

In employing the inventive mold-forming method, the prototype article is still formed as before. This prototype article can then be used to create an inexpensive microreplicated mold (either a split cavity or solid cavity mold). To do so, the prototype article is itself directly coated with a thin layer of electrically conductive material (e.g., metals such as silver), thus eliminating the need to produce a silicone mold and then an epoxy replicate of the prototype article. The inventive method thereby eliminates several steps from the mold-forming process and ensures that the mold used to form the finished article is a direct copy of the original prototype article. The making of an epoxy replicate article may introduce some molding inaccuracies due to shrinkage problems, mold filling problems, surface feature damage, etc. In the inventive process, the conductive coating may add a slight amount (approximately 1–2 mil. thickness) to the dimensions of each surface feature on the prototype article. Of course, any added thickness from the conductive coating can be factored into the design of the prototype article. Once coated, the coated prototype article is placed in an electroforming bath to be plated (preferably by nickel coating, or alternatively by a coating of one or more other suitable plating materials). Once the coated prototype article is nickel plated to a desired plating thickness, the assembly (prototype article covered by with nickel plating) is removed from the electroforming bath, and the prototype article itself is then removed or extracted from the nickel plating shell (usually causing the destruction of the prototype article in the process). The shell thus now has a cavity thereon corresponding (in a reverse image) in shape and surface topography features to the prototype article, and can serve as a mold for making polymeric finished articles which replicate the prototype article in shape and surface features.

This inventive method is a significant innovation to the current method for making stem web and grip molds using the conventional drilling/electro-discharge machining (EDM) process. Both standard split cavity molds and solid cavity molds can be made by this process. Conventional molding tools produced by the drilling process are extremely expensive, since a desired stem web grip pattern can contain up to about 500, about 1000, about 1500, about 3000 or even up to about 10,000 stems per square inch (where the stems may range in diameter, for generally cylindrical stems, from about 0.001 to about 0.030 inches). For instance it can cost more than $20,000 per mold just for drilling the holes to make a five-inch long bicycle grip mold having a 3000 stems per square inch stem web pattern. Further, such molds cannot even be produced for such small grip articles as a golf grip. A further advantage of the solid cavity mold (no split) attainable using the present invention is that it eliminates mold lines. Using the mold forming techniques of the present invention, a golf grip mold made by this replication process can be formed for less than $1,000 per mold cavity.

The inventive method is useful for making numerous types of grips, such as golf, bicycle, baseball, motorcycle, tools, handles, etc. The inventive process is extremely useful for making injection molded grips having a GREPTILE™ gripping material-like surface, due to the complexity and number of stems (i.e., 3,000 stems per square inch). This innovation results in a relatively inexpensive means for making an injection mold for a new article or application, where the quantity of parts to be produced cannot justify the tooling costs of prior mold making techniques, and provides the ability to make low cost, prototype molded grips which are production quality grips (e.g., for inexpensive product development and evaluation). Once a mold is made using the inventive process, the grip material/polymer for the ultimate finished article can then be optimized for that particular grip application on a relatively inexpensive basis.

The inventive mold production process can also be used to produce a mold for a zipper grip and other types of fasteners. As discussed above, a prototype (i.e., rapid prototype urethane model or other method) is first constructed of the fastener component, and the mold replication process is initiated. This process may also be suitable for producing low cost injection molds for other articles (i.e., parts or articles besides grips). For instance, the conductive silver coating has been found to sometimes release from an article as the nickel plating builds up initially thereon (the first 1–2 mil. of nickel), presumably because of insufficient surface contact area. The use of a relatively dense stem array on a surface to be replicated creates a significantly greater surface area on that surface, thereby providing much more surface for the conductive coating to adhere to (and likewise, for the nickel plating to adhere to). Thus, surfaces shapes which otherwise might not be susceptible to forming by electroforming can be formed into a mold, both extremely accurately and relatively inexpensively.

The present invention is simple, and presents a significant advantage because of its ability to make highly accurate molds that are otherwise too costly or difficult or impossible to produce by conventional mold production methods such as EDM, drilling, milling or tooling. There are, simply some products (such as grip designs like a golf club grip) where it was not possible due to the physical size and shape of the article to produce a conventional mold. This process also facilitates the production of an article such as a golf club grip without mold lines or areas with missing grip material stems, which otherwise would be present in conventional split cavity molds.

The novelty of the present invention is illustrated by the following example of making a finished molded product in the form of a golf club grip. A prototype golf club grip was produced by spirally wrapping a core 20 with a desired gripping material 22 to simulate the appearance of a spiral wrapped golf club grip (see FIG. 1). The core 20 was a metal core fabricated to give the desired dimensions for a standard 0.6 inch men's golf club grip, when the grip material 22 was wrapped upon it. The grip material was formed as a $13/16$ inch wide strip of grip material 22. The grip material itself was a GREPTILE™—like gripping material which had, on its outer surface, an array of upstanding flexible stems in a density of about 3,000 stems per square inch, with each stem having a 10.5 mil. base diameter. The stems were arranged in a square pattern, with equal spacing between adjacent stems in the x-direction and y-direction. The stem web was produced from an 80/20 blend of Estane™ 58661 polyurethane resin/Vector™ 4111 to have a 27 mil. stem height. It was ultimately desired to have a 20 mil finished stem height on the finished molded article—a 27 mil stem height was provided on the prototype article since it is well known that in a stem web molding process, the stems formed are always slightly shorter than the actual hole depth in the mold due to air entrapment and mold cavity filling difficulties. This is an important consideration for an 11-inch. long golf club grip which is injected molded with material injected from one end, because of the desire for uniform stem formation along the entire length of the grip. The strip of grip material 22 is formed so that along one edge (a $1/16$ inch selvage edge) there were no stems. Thus, the strip of grip material 22 has a stem array area 24 thereon, and an edge strip 26 with no stems. Since the grip material 22 is spirally wrapped on the core 20, as seen in FIG. 1, this stemless edge strip 26 thus defines a visible and tactilely noticeable spiral of the wrap of grip material 22 on the core 20. The core 20 was sprayed with a suitable adhesive (such as Scotch-Grip Super 77 spray adhesive available from Minnesota Mining and Manufacturing Co.), and then spirally wrapped with the $13/16$ inch wide strip of grip material 22 so that it would perfectly line up against its abutting edges without any overlap or gaps (any gaps or defects would, of course, be replicated into any mold formed therefrom).

By way of comparison, a prototype article formed in this manner was made and then used in a conventional process for making a mold. First, a silicone rubber reverse image of the prototype article was made, and then the prototype article removed to define a silicone rubber mold cavity having the outer desired shape and surface topography features of the desired golf club grip. That mold cavity was then filled with epoxy. It was difficult to get the epoxy to completely fill in all of the holes in the silicone rubber mold, but the use of a vacuum assist facilitated that process. However, once the epoxy cured, it could not be readily extracted from the silicone rubber mold because the epoxy stems were too rigid and completely were surrounded by silicone rubber. The silicone rubber mold thus had to be cut and removed from the epoxy replicate, thereby diminishing the advantage of the silicone rubber mold since a new silicone rubber mold must then be made to make another epoxy replicate. In addition, cutting away the silicone rubber mold from the epoxy replicate could lead to damage of the desired surface topography on the epoxy replicate.

Using the present invention, the prototype article (i.e., the prototype golf club grip as in FIG. 1) was first made, as described above. This prototype article, illustrated as prototype article 30 in FIGS. 2 and 2A was then air brush painted with conductive silver paint to make the entire grip conductive for the nickel plating process (the surface features of the prototype article could also be made conductive before the prototype article is made). Care was taken to make sure that every upstanding stem was coated completely by spraying it from all angles. The coated prototype golf club grip article was then checked for electrical conductivity to make sure that it was completely coated. Any defects in coating could be translated into the electroformed nickel mold to be made thereby. The prototype article 30 thus bears a coating 32, and becomes a coated prototype article 34 (see FIG. 2B). The conductively coated prototype article 34 is then placed in a nickel plating bath 36 for electroforming using techniques known in the art, and plated until a sufficient thickness (i.e., 0.30 inches) of nickel coating is formed thereon. This nickel coating thus defines a nickel plating mold or tool 38.

The nickel plated mold 38 was then milled on its outer surface to the desired dimension for use on a golf grip injection molding line. Typically, such a mold is mounted on inserts, or backing stiffeners, for further mounting and handling During the milling process, the nickel tool 38 became so hot that the adhesive between the core 20 and the grip material 22 became ineffective (i.e., it released) allowing the metal core 20 to be pulled longitudinally out of mold cavity in the nickel tool 38. The grip material 22 was then extracted from the mold cavity of the nickel tool 38 by just slowly pulling it out longitudinally. Because the stem web on the grip material 22 is elastic, it stretch-released from the silver coating on the mold by slowly peeling down the entire length of the mold cavity. The nickel tool 38 was then ready for insertion into a golf club grip injection molding line. On its inner mold face (within the mold cavity), the nickel tool 38 had a perfectly formed reverse or mirror image replicate of the desired surface topography for the golf club grip, including an array of upstanding stem cavities 40 (see FIG. 2C). Whatever other surface topography features were present in the conductively coated prototype article 34 have been transferred to the nickel tool 38 mold face.

The nickel tool 38 is illustrated as a unitary mold having a generally cylindrical mold cavity. The mold may be split in two or more mold segments or inserts to define a separable mold in use. This would allow the formation of articles such as grips with radially enlarged flanges on each end or with non-symmetrical features thereon.

While the above illustrated process is described with respect to a golf club grip prototype, the process works equally well for other types of grips, fasteners or even other articles to be molded. The prototype article can be formed of any suitable material or combinations of materials such as wood, metal, ceramic, polymers, etc., and be formed by any suitable technique such as rapid prototyping, epoxy casting, carving/cutting, and/or the assembly of other, previously formed materials and articles. What is important is that the prototype article have the shape and surface configuration desired for the polymeric article that will be eventually created from the mold made form the prototype article. It is also important that the prototype article have an electrically conductive outer surface (such as, for example, being able to receive a thin layer of conductive material (i.e., silver paint) on a first surface thereon) which is at least in part defined by a desired arrangement of fine topography features.

In the illustrative example, the fine topography features comprise a relatively dense array of upstanding generally cylindrical stems (the sides of each stem have a slight taper to facilitate removal from the mold). A variety of non-cylindrical shapes could also be utilized for the stems, such as truncated cones or pyramids, rectangles, hemispheres, squares, hexagons, octagons, gum drops and the like. In addition, the fine topography features could include other irregular shapes and surfaces exposed in any desired pattern or even in a random manner, or intricate channels or grooves for defining a fluid flow pattern across the surface to be molded. It is believed that this replicative mold production process enables the reproduction of surface features as fine as 0.0002 inches in dimension. The fact that such fine features are intricate actually aids in the mold forming process, in that the surface topography features then provide additional surface area for engagement of the conductive layer thereon (and during electroforming, engagement of the nickel plating thereon to inhibit premature separation of the nickel plating from the coated prototype article during electroforming). Indeed, the requisite fine topography features are characterized as those surface features which provide sufficient surface area to maintain the plating on the coated prototype article as the plating thickness and weight build up over time.

While in the above example, silver paint is noted as the layer of thin conductive material, other materials and techniques for applying the conductive material will suffice. For example, vapor coating, vapor disposition, sputter coating techniques or other known coating processes can apply sufficient conductive material to provide the electroconductivity needed for the electroforming process. Conductive materials that can be thinly applied onto the prototype article using any suitable coating techniques. No matter what conductive material or application technique is used, it is important that all exposed portions of the fine surface topography features be completely coated with the conductive material, in order to maximize plating surface area and to provide complete replication of the surface of the prototype article in the nickel plating process.

After the nickel molding tool 38 (FIG. 2) is formed and further processed, it is ready for use in making a molded polymeric article. The molded article can be injection molded discretely, or can be insert molded directly onto another element (e.g., molded directly onto the end of a golf club shaft). For instance, a nickel golf club molding tool such as nickel tool 38 can be used in a golf club grip injection molding line, such as used by the Tacki-Mac Division of Plastic Products Corp., Las Vegas, Nev. Sample golf grips were produced on this line with the nickel tool 38 using the following three material formulations:

A. 100% Starflex LC27060 (SBS block copolymer 45 Shore A hardness) from Star Plastics, Glenview, Ill.

B. A blend of 80% Starflex LC24188 (SEBS block copolymer 55 Shore A hardness) from Star Plastics, Glenview, Ill., and 20% Starflex LC25107 (SEPS block copolymer, 45 Shore A hardness) from Star Plastics, Glenview, Ill.

C. 80% Estane 58661 polyurethane resin from BF Goodrich, Cleveland, Ohio, and 20% Vector 4111 (SIS block copolymer) from Exxon Chemical Co., Houston, Tex.

Each of these formations included 1–2% carbon black pigment concentrate. Standard processing conditions for these resins were used to inject the molded grips into the nickel tool 38, on a Kawaguchi, Inc. Model 125 injection molding machine. A standard golf club end cap 50 was used (see FIG. 2), and the elastomeric resins were injected into the nickel tool's mold cavity through the center hole in the end cap 50 and around a core mandrel (not shown) positioned in the cavity. The finished grip was ejected from the mold cavity by being pushed out by axial movement of the core mandrel relative to the mold.

Using the 100% Starflex LC27060 resin material, a finished grip was formed which had a generally uniform stem height (23 mils.) down the entire 11 inch length of the grip. As mentioned above, the starting height for the stems on the prototype article was 27 mils., and it is typically difficult to fill completely an injection mold from one end. Using the 100% Starflex LC27060 material and the parameters discussed above, a golf club grip having an array of highly flexible upstanding stems on its outer gripping surface was made, wherein the stems were only four mils. shorter than those of the original prototype article. The resultant stem web construction had high friction characteristics and presented a soft feel to the touch, suitable for use as a grip. The stems formed were relatively flexible and bendable which facilitates creating the desired and predicted friction relationship between grip and hand, or grip and glove.

The 80/20 of Starflex LC24188 and Starflex LC25107 and the 80/20 blend of Estane 58661 and Vector 4111 were also molded into grips. The materials of this latter blend were not injection grade resins, and resisted release from the core pin. While only the above materials are provided as exemplary materials, the polymeric material to be molded can be any suitable material. Particularly suitable materials include thermoset or thermoplastic elastomers. In this context, the term "elastomer" refers to polymers that have resiliency properties similar to those of rubber. In particular, the term elastomer reflects the property of the material that it can undergo a substantial elongation and then returned to its original dimensions upon release of the stress elongating the elastomer. Examples of classes of elastomers suitable for use in connection with forming molded articles include anionic triblock copolymers, polyolefin-based thermoplastic elastomers, thermoplastic elastomers based on halogen-containing polyolefins, thermoplastic elastomers based on dynamically vulcanized elastomer-thermoplastic blends, thermoplastic polyether ester or polyester based elastomers, thermoplastic elastomers based on polyamides or polyimides, ionomeric thermoplastic elastomers, hydrogenated block copolymers in thermoplastic elastomer interpenetrating polymer networks, thermoplastic elastomers by carbocationic polymerization, polymer blends containing styrene/hydrogenated butadiene block copolymers, and polyacrylate-based thermoplastic elastomers. Some specific examples of elastomers are natural rubber, butyl rubber, EPDM rubber, silicone rubber such as polydimethyl siloxane, polyisoprene, polybutadiene, polyurethane, ethylene/propylene/diene terpolymer elastomers, chloroprene rubber, styrene-butadiene copolymers (random or block), styrene-isoprene copolymers (random or block), acrylonitrile-butadiene copolymers, mixtures thereof and copolymers thereof. The block copolymers may be linear, radial or star configurations and may be diblock (AB) or triblock (ABA) copolymers or mixtures thereof. Blends of these elastomers with each other or with modifying non-elastomers are also contemplated. Commercially available elastomers include block polymers (e.g., polystyrene materials with elastomeric segments), available from Shell Chemical Company of Houston, Tex., under the designation KRATON™. The materials can also include additives to improve wet or dry friction such as resins, pressure sensitive adhesives, fibers, fillers, colorants, and the like.

Figure 2:
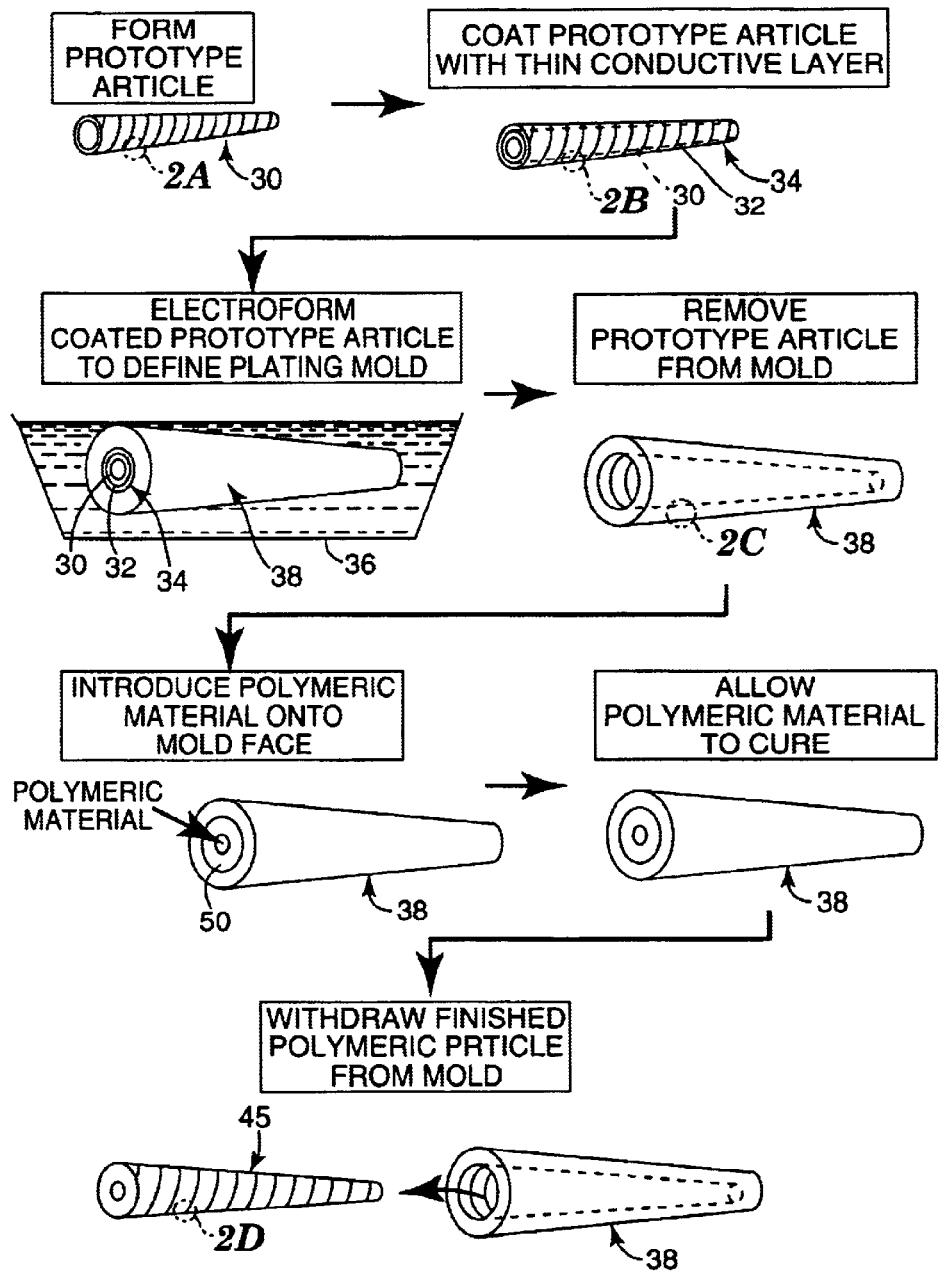
FIG. 2 is a diachromatic flow chart illustrating the various steps in producing a mold in accordance with the present invention, and then a finished polymeric article from that mold in accordance with the present invention.
Figure 2A:
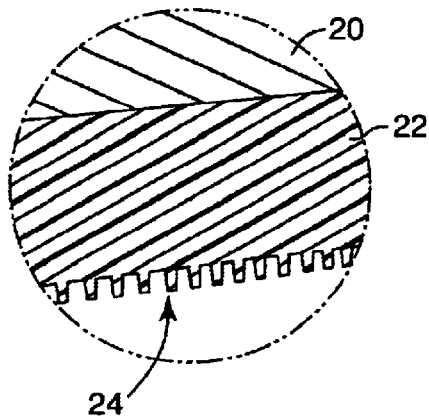
FIGS. 2A, 2B, 2C and 2D are enlarged partial sectional views as taken along the corresponding segments 2A, 2B, 2C and 2D in FIG. 2, illustrating features at various steps during the inventive method.
Figure 2B:
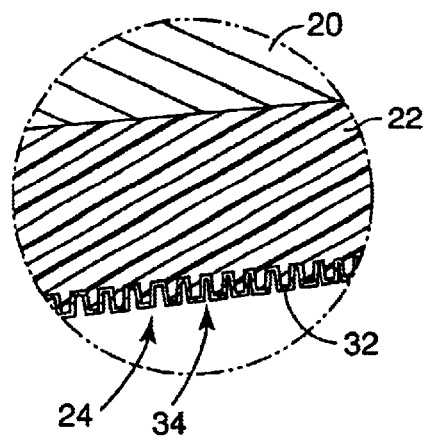
Figure 2C:
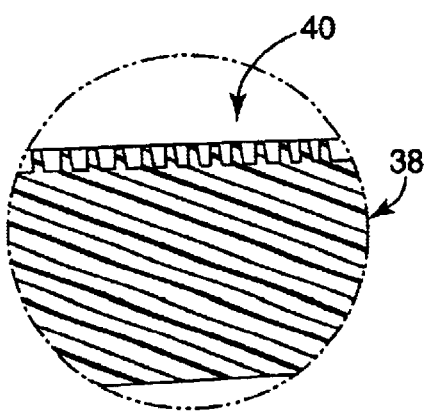
Figure 2D:
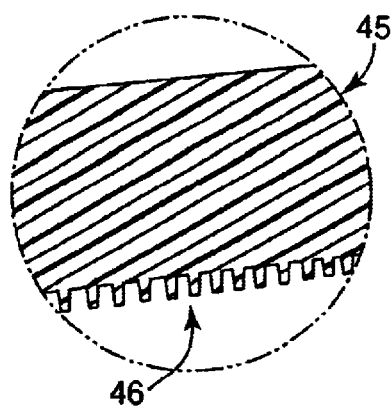

As illustrated in FIG. 2, the polymeric material is introduced into the nickel tool 38 and flows over and into the reverse image surface cavities on the mold face. After the polymeric material is allowed to cure (which, depending on the polymer employed, could include thermally curing or chemically curing), the finished polymeric article 45 is withdrawn from the nickel tool 38. In the case of a golf club grip, the finished golf club grip 45 is withdrawn longitudinally from within the nickel tool 38. The highly flexible upstanding stems stretch and flex to release from the tool's stem cavities 40 without breaking or tearing the stems. The resultant molded golf club grip 45 thus has a finished exterior surface with an array of upstanding highly flexible stems 46 thereon (see FIG. 2D) which conforms nearly identically to the original stem array 24 (FIG. 2A) on the prototype article 30. Any other topography features on the original prototype article 30 (whether fine topography features or otherwise) have likewise been transferred by the nickel molding tool 38 to the finished polymeric molded article 45. Virtually any surface topography configuration desired for the prototype article can be replicated using the inventive molding technique, so long as the fine topography features provide sufficient surface area to inhibit delamination of the initial plating layers (e.g., nickel plating less than about 0.010 inches thick) from coated prototype article during electroforming.

This technique thus permits the incorporation of design features into molded articles such as grips which were previously otherwise unattainable. For instance, stems of different height can now be readily formed, as well as other design patterns in addition to (or among) a stem web array or pattern. As mentioned above, a prototype article can be made in part from a sheet of stem web gripping material which has previously been formed, wherein the stem web has a plurality of relatively dense upstanding elastomeric stems. When it is desired to place a logo image or other specific pattern into a molded finished grip, the inventive method provides a means to do so. When the 3M GREPTILE™ gripping material is used for a surface topography pattern in the fabrication of prototype articles for making molds for the present invention, those molds are capable of molding the gripping material microreplicated stem detail directly into the molded part, and can include customer specific patterns and logos. Such patterns are made in the gripping material when it is in its flat state, prior to the wrapping of the material around a mandrel for mold fabrication to ultimately form a grip. An infinite variety of customer specific patterns and logos can be produced inexpensively using the inventive method. In addition, injection mold inserts with microreplicated detail can be made with this process.

One means of imprinting a pattern onto a grip surface is as follows. A desired pattern is reverse cut 0.05 inches deep into the surface of a ½ inch thick steel plate. The pattern in the steel plate can be fabricated by several processes, such as electrodischarge machining, milling, etching and engraving, to name a few. The pattern to be imprinted thus becomes the raised portion on the plate. The plate is then mounted on the platten of a press and heated to 185° C. A sheet of GREPTILE™ gripping material is mounted with its back side flat on sheet steel with a suitable adhesive (such as 3M photo mount spray adhesive), and located on an opposing platten at room temperature. The pattern on the heated steel plate is brought into contact with the stem array surface of the gripping material for less than one second and then released. The depth of imprint can be closely controlled, but can be as much as 0.005 to 0.010 inch below the base of the stems located on the gripping material. The stems contacted by the pattern are flattened by heat and pressure, resulting in a smooth surface. Grip material, temperature, depth of clamp and time of clamping are variables which must be controlled in order to form a smooth pattern without surface defects. A surface with partially flattened posts can also be made by making a shallower depth of pattern imprint.

This pattern-forming process thus provides a rapid method of producing complex geometric patterns and logos on the stem array surface of a sheet of GREPTILE™ gripping material. A detailed pattern is formed in the gripping material in the flat state, creating smooth areas and/or areas of partially flattened stems, depending on the desired result. The patterned gripping material can then be wrapped around a mandrel for use in the mold making method of the present invention. After applying the thin conductive layer, the pattern can be plated with nickel to produce a mold cavity insert (i.e., nickel tool 38). This insert can then be turned to shape and installed in a steel sleeve for mounting in an injection mold.

Customization and branding of products is quite common and highly desired in today's competitive product marketplace. In the case of molded grips, sellers of such products may require decorative patterns and that their trademarks be molded into such products. The ready ability to imprint a myriad of patterns via the present inventive process makes that possible with minimal tooling costs. Since the gripping material cannot be milled, laser machined or engraved easily, this process is an attractive and inexpensive way to provide attractive molded-in artwork and logos on such products.

Figure 3:
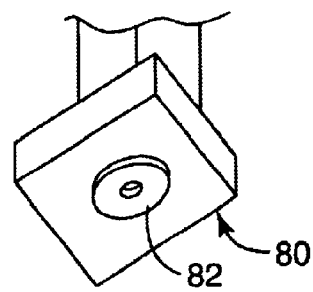
FIG. 3 illustrates a mold for imprinting a pattern into a sheet of gripping material, in preparation for producing a prototype article for replicate mold development.
Figure 4A:
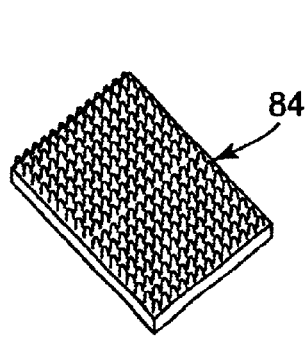
FIGS. 4A and 4B illustrate a sheet of preformed surface topography material, before (FIG. 4A) and after (FIG. 4B) engagement with the pattern mold of FIG. 3.
Figure 4B:
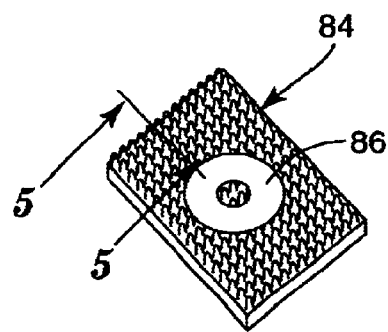
Figure 5:
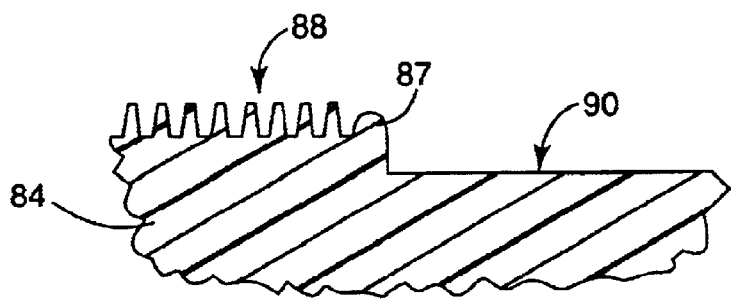
FIG. 5 is a sectional view as taken along lines 5—5 in FIG. 4B.

FIG. 3 illustrates a steel plate 80 having a mold pattern 82 formed thereon for use in this process. FIG. 4A illustrates a sheet of GREPTILE™ gripping material prior to pattern formation. FIG. 4B illustrates that same sheet of gripping material 84 after contact with the pattern 82 on the steel plate 80, thereby resulting in a mirror image pattern 86 of flattened and smooth stems on the gripping material 84. Some deformation occurs at the juncture of the flattened area and the stem web, as illustrated in FIG. 5. An edge bead 87 may form between an area of untreated stem web 88 and a flattened area 90 on the surface of the gripping, material depending on the depth of imprint into the gripping material 84 by the pattern 82. In some designs, this edge bead 87 may serve to further highlight and define the pattern formed in the gripping material 84.

As mentioned above, the pattern forming technique preferably flattens the stems to achieve a nearly planar result (an area having no topography features). However, depending upon the depth of pattern imprint, the stems may not be completely flattened, thereby leaving some fine topography features, or the pattern (i.e., the pattern 82 on the steel plate 80) may itself include topography features on its active face so that the stems are actually heat and pressure molded into an alternative topography configuration in the pattern molded area on the stem web. In any event, any desired image texture or pattern formed therein by this technique is disposed on the prototype article and then transferred via the inventive mold replication process to the operative molding face of an electroformed mold, and then that pattern is further transferred to the finished surface of the ultimate polymeric molded article made by such a mold.

As disclosed herein, the inventive molding process allows a mold to be created for forming a finished article having a variety of surface topography features, including stem webs wherein the stems have varying heights. In the case of a grip (such as a golf club grip or a tool grip), it may be desirable to have different height stems on different portions of the grip. A golfer often wears a golf glove on one hand (typically, a right-handed golfer will wear a glove on the left hand). With respect to a golf club grip, it may be desirable to have shorter stems contact the bare hand with longer stems contacting the gloved left hand. A golf club grip having a GREPTILE™ gripping material-like surface is designed to afford a golfer a more shear resistant hold with less gripping force required by the hands, in both wet and dry conditions. Such a grip may be used with bare hands, a typical golf glove such as a leather glove, or in conjunction with a GREPTILE™ gripping material golf glove design. Since the vast majority of golfers do not use a glove on the right hand, the posts are made shorter in the middle of the grip so as to minimize the possible "motion" affect of the right hand on top of the taller stems (which could bend and move under the hand). A golfer would tend to grip the club tighter if a sense of slip or motion is felt in the golfer's hands.

Providing different height stems on a finished golf club grip is possible by making a prototype golf club grip with different height stems and then replicating the prototype grip through the inventive molding process. This can be accomplished simply by securing stem webs having different stem heights on the core to form a prototype article. Alternatively, a stem web having uniform stem heights can be applied to a core, and then the stem heights modified by application of heat or by shaving the stems on a turning lathe, for example. Any number of means is possible in order to vary the height of the stems on a prototype article. However, ultimately those stems on the prototype article will be replicated using the inventive mold making process, as explained above.

In one example of such a finished polymeric article, as illustrated in FIG. 6, an upper portion of an inventive golf club grip 100 defines a zone 101 of stems, each stem having a generally uniform height of approximately 0.026 inches (see also FIG. 6A). A central portion of the golf club grip 100 defines a second zone 103 of stems, with each stem having a generally uniform height of approximately 0.010 inches. A lower portion of the golf club grip 100 has a third zone 105 of stems, with each stem having a generally uniform height of approximately 0.026 inches. As illustrated in FIG. 6, the golf club grip 100 is formed to simulate a spirally wrapped grip, with a spiral band or seam 106 formed to have no stems thereon. The grip 100 illustrated in FIG. 6 also includes a first separation band 107 and a second separation band 109. Like the spiral band 106, the separation bands 107 and 109 likewise have no stems thereon, and serve as transitions between the adjacent zones of differing height stems.

As discussed above, a prototype golf club grip article is made having essentially the same configuration and dimensions as the grip 100 discussed above and illustrated in FIG. 6. That prototype grip is then entirely covered on its gripping surface with a thin conductive layer of material. The coated grip assembly is then deposited in an electroforming bath, and over time, the plating builds up to a sufficient thickness to define an article mold. The prototype grip is removed and the article mold will then serve to form the basis for making a plurality of molded polymeric grips like that shown in FIG. 6.

A second example of an inventive grip having non-uniform height stems is illustrated in FIG. 7. A golf club grip 110 likewise has three major zones of stems, with the stems having generally uniform heights within each zone. The grip 110 also includes transition zones to gradually make the stem height transition from zone to zone. Specifically, adjacent its upper end, the grip 110 has a first upper zone 111, wherein each stem in that zone has a generally uniform height of approximately 0.020 inches (see also FIG. 7A). Adjacent to the center of the grip 110 is a second central zone 112, with each stem in the second zone 112 having a generally uniform height of approximately 0.005 inches. Adjacent its lower end, the grip 110 has a third lower zone 113, with each stem within the third zone 113 having a generally uniform height of approximately 0.020 inches. A first transition zone 114 extends about the circumference of the grip 110, between the first zone 111 and the second zone 112. The transition zone may have any suitable longitudinal length, as desired. The stems within the first transition zone 114 have, at the longitudinal end of the zone 114 adjacent to first zone 111, a height of approximately 0.020 inches. The stems at the end of the first transition zone adjacent the second zone 112 have a height of approximately 0.005 inches. Between the first and second ends of the first transition zone 114, the height of the stems in the first transition zone 114 change (i.e., transition) from approximately 0.020 inches to approximately 0.005 inches. This transition may be as gradual as the longitudinal length of the first transition zone 114 will allow, thereby feathering out the stem height transition, or it may occur in one or more stepped intermediate height zones along the first transition zone 114, with those intermediate zones having uniform or varying longitudinal lengths. A second transition zone 115 is disposed circumferentially about the grip 110 between the second zone 112 and third zone 113 and can any suitable longitudinal length. The stems within the second transition zone 115 likewise make a transition between the higher stems of the third zone 113 and the shorter stems of the second zone 112, and that transition can be accomplished in any of the manners proposed above with respect to the first transition zone 114.

A prototype golf club grip article is made having essentially the same configuration and dimensions as the grip 110 discussed above and illustrated in FIG. 7. That prototype grip is then entirely covered on its gripping surface with a thin conductive layer of material. The coated grip assembly is then deposited in an electroforming bath, and over time, the plating builds up to a sufficient thickness to define an article mold. The prototype grip is removed and the article mold will then serve to form the basis for making a plurality of molded polymeric grips like that shown in FIG. 7.

The taller stems in the first and third zones on the golf club grips 100 and 110 have an aspect ratio of about 3:1, and may have a height of about 0.020 to about 0.030 inches. The shorter stems in the second or central zones on the golf club grips 100 and 110 have an aspect ratio of about 1:1 or less, and may have a height of less than about 0.010 inches. For purposes of this disclosure, aspect ratio refers to the ratio of a stem's height to that stem's lateral cross-sectional dimension. With respect to a cylindrical stem, the aspect ratio is the ratio of the stem height to the stem diameter, taken midway along the stem height. With respect to other features having non-circular cross-sections, the "hydraulic radius" provides a reference basis for determining the stem's cross-sectional dimension, midway along the feature height. Hydraulic radius is the cross-sectional area of a feature divided by the length of its perimeter (in this case, taken at a point along the height of the feature).

The stems in the central zones, having an aspect ratio of about 1:1 or less, are thus more stiff (relative to side-to-side bending) than the taller stems of the upper and lower zones, thereby reducing the likelihood that a sense of motion will be detected by a golfer during use (i.e., motion between the golfer's hand and the golf club grip as the club is swung). As noted, a golfer's left hand is typically gloved, and the stems tend to impress into the glove. In that case where the golfer is wearing a glove bearing GREPTILE™ gripping material on the glove, the stems on the glove interact with the stems on the golf club grip to provide even more significant resistance to slip, even when wet. On the lower portion of the golf club grip (the third zone 105, in FIG. 6 and the third zone 113 in FIG. 7), the taller stems are provided to take advantage of a golf glove bearing GREPTILE™ gripping material thereon. When chipping, a golfer will often place the gloved left hand on the lower part of the golf glove grip and the right hand below the left hand, on the bare golf club shaft, thereby shortening the effective club length for more control. The stems on the GREPTILE™ gripping material of the glove thus interact with the stems on the third zone of the golf club grip, adjacent its lower end, to effect an aggressive frictional interface therebetween.

A third example of an inventive grip having non-uniform height stems is illustrated in FIG. 8. A golf club grip 120 again has three major zones of stems, with the stems having uniform heights within each zone. The grip 120 also has longitudinally disposed transition zones between the three major zones of stems, similar to the golf club grip configuration shown in FIG. 7. Grip 120 of FIG. 8 does not have the "wrapped" or spiral design incorporated into its surface topography configuration. Rather, longitudinal strips are provided in the grip to simulate a half cord grip design. Each strip is approximately 1/16 inch wide and devoid of stems. Three strips or "seams" 122, 124 and 126 may be provided and disposed about the circumference of the grip 120 as depicted in FIG. 9, which is an end view of the finished molded golf club grip 120. Again, after making a prototype grip having these surface topography features, the inventive mold making process may be employed.

A fourth example of an inventive grip is illustrated in FIG. 10. In this particular example, a golf club grip 130 has stems of uniform height along its entire length, and has a flat pad or zone 132 along a central/lower portion of the grip for the right and left thumbs of the golfer's hands to rest upon. The flat pad 132 is formed in the prototype article for this grip 130 using the pattern forming technique discussed above. The flat pad 132 may include raised or lowered images thereon, such as a product trademark 134. Other design patterns, such as a stem-free spiral 136, may also be provided for ornamental or functional purposes on the golf club grip 130. The golf club grip design 130, with the flat area for the golfer's thumbs, may alleviate the impression that more grip pressure is needed because of movement of the stems under the thumbs (since those stems are no longer present). For esthetic or functional reasons, a golf club grip may also include one or more additional areas thereon with no stems. Yet again, once a prototype grip having those desired surface features is formed, it may be replicated for mold-making purposes via the inventive mold fabrication process disclosed herein.

Figure 11A:
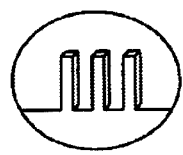
FIGS. 11A, 11B and 11C are enlarged views of portions of alternative surface feature configurations of the present invention.
Figure 11B:
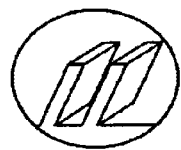
Figure 11C:
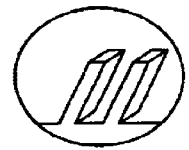

As illustrated in FIGS. 6A, 7A, 8A and 10A, the stems of the illustrated examples are generally cylindrical in shape (there is typically some draft designed into the stems to facilitate mold cavity release). The shapes of the stems or elements are not limited to cylindrical shapes, however. For instance, stems having D-shaped, crescent-shaped, oval, trapezoidal, square or rectangular lateral cross-sectional shapes may be desired in particular applications, as they can be aligned to afford more surface area in the direction of the shear force as applied during a golf swing (in part by elongation of the shape of the stem normal to the direction of applied shear force). Examples of such some of these stem shapes are illustrated in FIGS. 11A, 11B and 11C. Again, the production of a molded polymeric article having a finished surface including microreplicated stems with the shapes and orientations such as shown in FIGS. 11A, 11B and 11C is facilitated by the inexpensive and simple mold replication process of the present invention. As long as the fine surface topography features (such as the stems of FIGS. 11A, 11B and 11C) can be formed on a prototype and then readily transferred to a nickel molding tool as described herein, the reproduction of a molded polymeric article having a surface bearing such microreplicated features is possible (whereas previously, it would have been unduly prohibitive to make a mold for such purpose, because of difficulties in tooling the mold by drilling, machining, etc. or in precisely maintaining the requisite surface features through prior art replication molding techniques).

As noted above and seen in FIGS. 11B and 11C, some stem configurations are elongated in lateral cross section. One aspect of the present invention thus relates to gripping and impact bearing surfaces that employ directional microreplicated features. In this regard, the use of directional microreplicated structures is not limited to molded polymeric articles, but rather is applicable to any article or sheet bearing a microreplicated stem web on a surface thereof (including webs, strips or sheets of such material). Directional microreplicated features have an active cantilever mechanical functionality that provides unique deformation properties when compressed. Thus, for a surface comprised of stem structures such as illustrated in FIGS. 11B and 11C, a force applied left-to-right will result in the bending of those stem structures toward the face of their supportive base, bending generally to the right as seen in those FIGS. This may have the effect of readily creating more engaged surface area, to a surface applying a normal force on the surface particularly when the stems are elongated to present longer faces to the engaging surface upon being compressed and deformed.

Figure 12:
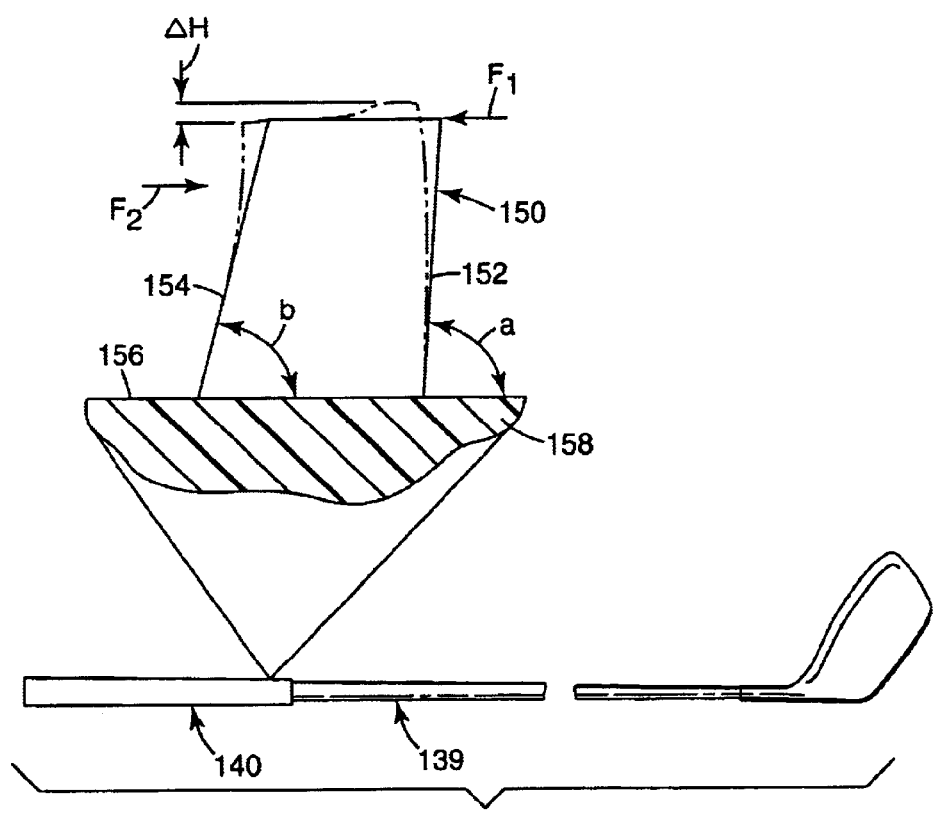
FIG. 12 illustrates a golf club having a fifth alternative golf club grip made according to the present invention, with an enlarged representation of one of the stems on that golf club grip.

The orientation of these inventive directional microreplicated features additionally provides for direction specific slip resistance. This is accomplished in part by angling the features relative to the supported base, and then orienting those features in a common orientation (e.g., wherein the lateral feature elongation and angles are all commonly aligned from feature to feature and/or oriented in a particular overall pattern feature on the surface). One feature orientation that has proved particularly useful in this regard is illustrated in FIG. 12, which shows a golf club 139 having a golf club grip 140 thereon, and which illustrates a tilted stem 150 (as viewed from an end of the stem and generally shaped like the stems shown in FIGS. 11B and 11C). The stem 150 has opposed sidewalls 152 and 154. These sidewalls extend upwardly from a face 156 of a support base 158 which is formed integrally with the stem 150. The face 156, at least adjacent the stem 150, is generally planer, and the sidewalls 152 and 154 project outwardly therefrom at angles a and b, respectively. As illustrated in FIG. 12, both angles are less than 90E, and angle a is greater than angle b (in one embodiment, angle a=80E and angle b=78E). The stem configuration of FIG. 12 thus results in a stem which exhibits different reactions when forces are applied against the stem from the sides thereof, depending upon which side. For example, a force applied in the direction $F_1$ (to the left as viewed in FIG. 12) will actually urge an upper portion of the stem to the left and will initially cause an increase in the height of the stem relative to the face 156 of the base 158, in the amount of $\Delta H$ (initial stem deformation is illustrated in phantom in FIG. 12). The magnitude of $\Delta H$ may be rather small (e.g., 0.0013 inches for a 0.015 inch high stem). A force $F_2$ applied in an opposite direction (to the right as viewed in FIG. 12) will tend to initially urge the stem 150 to the right and to decrease the stem 150 in height as the stem bends over. As the golf club 139 is swung by a user, forces are applied via the golfer's hands to the stems 150 such as force $F_1$, thereby deflecting the stems to the left and away from the face 156 of the base 158 of the golf club grip 140. The tops of the stems 150 so affected will thus "dig in" to the golfer's hand (gloved or not) and exhibit an apparent greater stiffness resisting relative longitudinal motion between the golfer's hands and the golf club grip 140. Thus, each stem is configured so that under lateral deflection in the direction of force $F_1$, the stem slightly increases in height. During the application of club swinging forces, portions of the grip diameter thus may actually "grow" because of grip stem deformation.

A golf club grip 170 having its surface defined by arrays of stems in the configuration illustrated in FIG. 12 is shown in FIG. 13. Rectangular stems are provided on the golf club grip 170 in an effort to maximize the gripping surface area of the stems in the direction of longitudinal force applied relative to the grip 170. In addition, the elongated side walls of the stems are tapered, with the side facing the club head end of the grip 170 set at the larger angle (angle a) relative to the longitudinal axis of the grip 170 than the other side. This orientation provides a sense of "grain" resistance to the centrifugal force of the golf club on the hands of a golfer as the golf club is swung (like the resistance encountered when petting a short-haired dog from tail to neck, i.e., against the grain). In the illustrated embodiment, the heights of the stems are modified in the same manner as illustrated in connection with the exemplary grips of FIGS. 6, 7 and 8, with the stems in a central grip zone (see e.g., FIG. 13B) being shorter in height than the stems in upper and lower grip zones (see e.g., FIGS. 13A and 13C). Thus, the stems are shorter where the bare right hand would tend to be placed on the golf club grip 170 when gripping the golf club.

Another grip application where directional microreplicated features can be applied is a motorcycle throttle grip, where it may be desirable to exhibit a higher frictional interface as the grip is rotated in one direction on its axis (e.g., when the grip is rotated to open the motorcycle throttle). In this arrangement, the angled faces of the stems are aligned longitudinally along the stem's length, rather than laterally as in the golf club grip examples herein. In other words, the stem orientation relative to the grip's longitudinal axis is turned by 90°. In other embodiments, the stem orientations may be non-linear, so that the stems are arranged in an arced dispersal on their base surface. The golf and motorcycle grip examples are but two examples where directional microreplicated structures may prove useful on a grip—numerous other applications are possible, in response to specific frictionally desired grip attributes.

While it is possible to make a grip such as golf club grip 170 by the inventive mold replication process of the present invention (see e.g., FIG. 2) an alternative mold production process is also available when the topography features have generally planar sides (e.g., when they are rectangular in lateral cross-section). The alternative process is possible because the prototype grip is made of metal and thus need not be coated with a thin conductive layer of material prior to electroforming. In this regard, a prototype article for making the golf club grip 170 can be made by machining a bar of aluminum stock to form the stems 150. A plurality of circumferential cuts or grooves define the sidewalls of the stems, while a plurality of longitudinally aligned grooves define the end walls of the stems. Further, the heights of the stems can be machined to a desired depth on a precision lathe or by other suitable machine processes as well. A prototype article can be formed in this manner (or to have other desired surface features), and because the prototype article is already metallic, it need not be then coated with a thin conductive layer prior to electroforming. The metallic prototype article can be itself deposited in an electroforming bath for nickel plating to define a reverse image mold thereof. Once the plating thickness has built up to a desired level, the metallic prototype article can be removed from within the nickel molding tool by known techniques, and the mold tool is thus ready for use in replicating golf club grips such as the grip 170 illustrated in FIG. 13.

As noted above, the elongation, tilting and orientation of a stem such as directional microreplicated stem 150 (FIG. 12) is not limited in application to molded articles such as molded golf club grips. Stems having these orientations and configurations can be formed on a sheet of elastomeric stem web material. By orienting the stems as disclosed herein, slip along a product's surface defined by the stems can be either promoted or inhibited. Thus, for example, the stems on the stem array of a GREPTILE™ gripping material-like surface can be modified like those of FIG. 12 in order to attain desired gripping characteristics in particular directions under an applied load. In web form, the stems and their supportive base layer may be then applied to numerous applications for friction control or dampening. In some embodiments, the stems are integral with the base layer and project outwardly therefrom. Whatever mold is used for the production of directional microreplicated structures must have its structure reverse image structure cavities canted relative to the mold face to form the canted product surface features. The elastomeric finished product material bends and stretches as it releases from those cavities without damage to the features formed thereon. The base layer of the web may be bonded to other reinforcing layers and the like for use, and may include other cooperative topography features such as channels, or stems having different configurations.

In addition, the stem height variation features and stemless topography features disclosed herein are not limited in application to molded articles such as molded golf club grips. A sheet of elastomeric stem web material can have zones of stems of different height such as the discrete uniformly high stem zones disclosed herein, or can have a zone of stems thereon where the height of the stems varies, either uniformly or in another designed relationship within that zone, or can have a zone without stems. Thus, for example, the stems on the stem array of web of GREPTILE™ gripping material-like surface can be modified to have stem height zones similar to those illustrated on the grips of FIGS. 6, 7, 8, 10 and 13, in order to attain desired frictional characteristics under applied load conditions. In web form, the stems and their supportive base layer may be then applied to numerous applications for friction control or force and vibration dampening. In some embodiments, the stems are integral with the base layer and project outwardly therefrom. The base layer of the web may be bonded to other reinforcing layers and the like for use, and may include other cooperative topography features such as channels, or stems having different configurations.

Varying the heights of the microreplicated features is but one way to vary the configuration of those features. The features may also be varied in other dimensions (such as diameter for generally cylindrical stems) or shape. An arrangement of microreplicated features on a surface to be replicated (or a zone thereof) may be uniform or varied in some manner, such as by being different in height or shape. Any possible configuration of microreplicated features, or mix and match of differently shaped or sized features, is made possible via the present invention. If the microreplicated shape can be placed on a prototype article and provided with a conductive surface, it is possible to form a mold for reproduction of that prototype article into finished polymeric articles.

This inventive disclosure thus presents various aspects in connection with the production of microreplicated surfaces. In one regard, the invention is directed to a simple and extremely economical method for making a tool mold used in molding articles having such microreplicated surface features. In another aspect, the invention is directed to a method of making polymeric articles using such a mold. In addition, the invention is directed to particular microreplicated features which can be formed on such molded articles, or on articles formed by other microreplication molding techniques (such as web forming and in-line molding processes). In each aspect, the invention provides significant advantages and improvements over the known state of the art.

Although the present invention has been described with reference to preferred embodiments, workers skilled in the art will recognize that changes may be made in form and detail without departing from the spirit and scope of the invention.

What is claimed is:

1. A method of making a molded polymeric article, the method comprising:

electroforming a plating onto a first surface of a prototype article, wherein the first surface is defined at least in part by a desired arrangement of fine topography features and is electrically conductive, so that the plating defines an article mold having, on a first portion thereof corresponding to the first surface of the prototype article, a reverse image arrangement of the fine topography features thereon;

separating the prototype article from the article mold;

introducing a polymeric material onto the article mold which flows into and over the reverse image arrangement of fine topography features;

curing the polymeric material; and separating the cured polymeric material from the article mold to define a molded polymeric article having, on a finished surface corresponding to the first portion of the article mold, a desired arrangement of fine topography features thereon, wherein at least a portion of the desired arrangement of fine topography features on the finished surface includes an array of upstanding stems, and wherein the array of upstanding stems has a density of at least about 3000 stems per square inch.

2. The method of claim 1, and further comprising:

forming the finished surface of the molded polymeric article to have a desired friction-defining characteristic.

3. The method of claim 1 wherein the array has a plurality of zones of upstanding stems, and wherein the stems in adjacent zones differ in height.

4. The method of claim 3 wherein the stem height change from one zone to the next is gradual.

5. The method of claim 3 wherein the array has a plurality of zones of upstanding stems, and wherein the stems in adjacent zones differ in configuration.

6. The method of claim 1 wherein the conductive material is a metallic paint.

7. The method of claim 1, and further comprising:

verifying the electrical conductivity of the coated portions of the prototype article prior to the electroforming step.

8. The method of claim 1, and further comprising:

defining the first surface of the prototype article to include at least one area having no topography features.

9. The method of claim 8 wherein the one area is generally planar.

10. The method of claim 1 wherein the article mold is defined as two or more separable mold sections, and wherein the separating step includes moving the mold sections apart from each other.

11. The method of claim 1, and further comprising:
forming the prototype article; and
coating portions of the prototype article, including at least the first surface there, with a thin layer of conductive material.

12. A method of making a molded polymeric article, the method comprising:
electroforming a plating onto a first surface of a prototype article, wherein the plating is electroformed to a depth of about 0.30 inches on the prototype article, wherein the first surface is defined at least in part by a desired arrangement of fine topography features and is electrically conductive, so that the plating defines an article mold having, on a first portion thereof corresponding to the first surface of the prototype article, a reverse image arrangement of the fine topography features thereon;
separating the prototype article from the article mold;
introducing a polymeric material onto the article mold which flows into and over the reverse image arrangement of fine topography features;
curing the polymeric material; and
separating the cured polymeric material from the article mold to define a molded polymeric article having, on a finished surface corresponding to the first portion of the article mold, a desired arrangement of fine topography features thereon.

13. The method of claim 12 wherein the array has a plurality of zones of upstanding stems, and wherein the stems in adjacent zones differ in height.

14. The method of claim 13 wherein the stem height change from one zone to the next is gradual.

15. The method of claim 13 wherein the array has a plurality of zones of upstanding stems, and wherein the stems in adjacent zones differ in configuration.

16. The method of claim 12, and further comprising:
verifying the electrical conductivity of the coated portions of the prototype article prior to the electroforming step.

17. The method of claim 12, and further comprising:
defining the first surface of the prototype article to include at least one area having no topography features.

18. The method of claim 17 wherein the one area is generally planar.

19. The method of claim 12 wherein the article mold is defined as two or more separable mold sections, and wherein the separating step includes moving the mold sections apart from each other.

20. The method of claim 12, and further comprising:
forming the prototype article; and
coating portions of the prototype article, including at least the first surface there, with a thin layer of conductive material.

21. A method of making a mold for use in forming a polymeric molded article, the method comprising:
forming a prototype article having a first surface thereon, the first surface defined at least in part by an array of upstanding stems;
coating portions of the prototype article, including at least the first surface thereon, with a thin layer of conductive material;
electroforming a plating onto the coated portions of the prototype article, wherein the plating is electroformed to a depth of about 0.30 inches on the prototype article, to define an article mold having, on a first portion thereof corresponding to the first surface of the prototype article, an array of upstanding stem cavities therein; and
separating the prototype article from the article mold.

22. The method of claim 21, and further comprising:
verifying the electrical conductivity of the coated portions of the prototype article prior to the electroforming step.

23. The method of claim 21 and further comprising:
defining the first surface of the prototype article to include at least one area having no stems thereon.

24. The method of claim 23 wherein the one area is generally planar.

25. The method of claim 21 wherein the array has a plurality of zones of upstanding stems, and wherein the stems in adjacent zones differ in height.

26. The method of claim 25 wherein at least one of stem height changes between adjacent zones is gradual.

27. The method of claim 21 wherein the article mold is defined as two or more separable mold sections, and wherein the separating step includes moving the mold sections apart from each other.

28. A method of making a mold for use in forming a polymeric molded article, the method comprising:
forming a prototype article having a first surface thereon, the first surface defined at least in part by an array of upstanding stems;
coating portions of the prototype article, including at least the first surface thereon, with a thin layer of conductive material;
electroforming a plating onto the coated portions of the prototype article to define an article mold having, on a first portion thereof corresponding to the first surface of the prototype article, an array of upstanding stem cavities therein;
separating the prototype article from the article mold; and
defining the first surface of the prototype article to include at least one area having no stems thereon, wherein the defining step includes:
initially forming the first surface of the prototype article from a polymeric member having an array of upstanding stems projecting from a base formed integrally with the stems; and
urging a heated pattern mold against the polymeric member to deform selected stems by heat and pressure.

29. The method of claim 28 wherein the selected stems are flattened.

30. The method of claim 28, and further comprising:
defining a desired image texture on the pattern mold.

31. A method of making a molded polymeric article, the method comprising:
electroforming a plating onto a first surface of a prototype article, wherein the first surface is defined at least in part by a desired arrangement of fine topography features and is electrically conductive, so that the plating defines an article mold having, on a first portion thereof corresponding to the first surface of the prototype article, a reverse image arrangement of the fine topography features thereon;
separating the prototype article from the article mold;
introducing a polymeric material onto the article mold which flows into and over the reverse image arrangement of fine topography features;
curing the polymeric material; and
separating the cured polymeric material from the article mold to define a molded polymeric article having, on a finished surface corresponding to the first portion of the article mold, a desired arrangement of fine topography features thereon, wherein at least a portion of the desired arrangement of fine topography features on the finished surface includes an array of upstanding stems, and wherein the array of upstanding stems has a density of at least about 500 stems per square inch.

32. The method of claim 31, wherein the array of upstanding stems has a density of at least about 1000 stems per square inch.

33. The method of claim 31, wherein the array of upstanding stems has a density of at least about 1500 stems per square inch.

34. The method of claim 31 wherein the array has a plurality of zones of upstanding stems, and wherein the stems in adjacent zones differ in height.

35. The method of claim 34 wherein the stem height change from one zone to the next is gradual.

36. The method of claim 34 wherein the array has a plurality of zones of upstanding stems, and wherein the stems in adjacent zones differ in configuration.

37. The method of claim 31, and further comprising:
verifying the electrical conductivity of the coated portions of the prototype article prior to the electroforming step.

38. The method of claim 31, and further comprising:
defining the first surface of the prototype article to include at least one area having no topography features.

39. The method of claim 38 wherein the one area is generally planar.

40. The method of claim 31 wherein the article mold is defined as two or more separable mold sections, and wherein the separating step includes moving the mold sections apart from each other.

41. The method of claim 31, and further comprising:
forming the prototype article; and
coating portions of the prototype article, including at least the first surface there, with a thin layer of conductive material.

* * * * *

UNITED STATES PATENT AND TRADEMARK OFFICE
CERTIFICATE OF CORRECTION

PATENT NO. : 6,800,234 B2
DATED : October 5, 2004
INVENTOR(S) : Ferguson, Dennis E.

It is certified that error appears in the above-identified patent and that said Letters Patent is hereby corrected as shown below:

Title page,
Item [56], References Cited, FOREIGN PATENT DOCUMENTS, delete "0 855 705", insert in place thereof -- 0 885 705 --;

Column 4,
Line 19, after "mirror" delete ",";
Line 20, after "cavity" delete ",";

Column 5,
Line 8, after "instance" insert -- , --;
Line 57, after "are" delete ",";

Column 6,
Lines 16 and 17, after "mil" insert -- . --;
Line 22, after "inch" delete ".";

Column 7,
Line 18, after "handling" insert -- . --;

Column 9,
Line 15, after "80/20" insert -- blend --.

Column 13,
Line 53, delete "zones,having", insert in place thereof -- zones, having --;

Column 16,
Line 52, after "metal" insert -- , --;

Column 17,
Line 41, insert -- a -- before "web";

UNITED STATES PATENT AND TRADEMARK OFFICE
CERTIFICATE OF CORRECTION

PATENT NO. : 6,800,234 B2
DATED : October 5, 2004
INVENTOR(S) : Ferguson, Dennis E.

It is certified that error appears in the above-identified patent and that said Letters Patent is hereby corrected as shown below:

Column 19,
Line 23, after "features" delete ";", insert in place thereof -- : --.

Signed and Sealed this

Twenty-seventh Day of September, 2005

JON W. DUDAS
*Director of the United States Patent and Trademark Office*

UNITED STATES PATENT AND TRADEMARK OFFICE
CERTIFICATE OF CORRECTION

PATENT NO. : 6,800,234 B2
APPLICATION NO. : 10/005831
DATED : October 5, 2004
INVENTOR(S) : Dennis E. Ferguson It is certified that error appears in the above-identified patent and that said Letters Patent is hereby corrected as shown below:

Title page,
Under 'Foreign Documents', the third EP reference, delete "0 855 705", insert in place thereof -- 0 885 705 --;

Column 4,
Line 19, After 'mirror' delete ",";
Line 20, After 'cavity' delete ",";

Column 5,
Line 8, After 'instance' insert -- , --;
Line 57, After 'are' delete ",";

Column 6,
Line 16, After 'mil' insert -- . --;
Line 17, After 'mil' insert -- . --;
Line 22, After 'inch' delete ".";

Column 7,
Line 18, After 'handling' insert -- . --;

Column 9,
Line 15, After '80/20' insert -- blend --;

Column 13,
Line 53, Delete "zones,having", insert in place thereof -- zones, having --;

Column 16,
Line 52, After 'metal' insert -- , --;

Column 17,
Line 41, Insert -- a -- before 'web';

UNITED STATES PATENT AND TRADEMARK OFFICE
CERTIFICATE OF CORRECTION

PATENT NO. : 6,800,234 B2
APPLICATION NO. : 10/005831
DATED : October 5, 2004
INVENTOR(S) : Dennis E. Ferguson It is certified that error appears in the above-identified patent and that said Letters Patent is hereby corrected as shown below:

Column 19,
Line 23, After 'features' delete ";", insert in place thereof -- : --.

Signed and Sealed this

Fourth Day of March, 2008

JON W. DUDAS
*Director of the United States Patent and Trademark Office*